(12) United States Patent
Tinsley

(10) Patent No.: US 9,456,689 B1
(45) Date of Patent: Oct. 4, 2016

(54) PLANT GROWING HEAVY WEIGHT BEARING SUPPORT ASSEMBLY, APPARATUS AND SYSTEM

(71) Applicant: Michael Robert Tinsley, Coral Springs, FL (US)

(72) Inventor: Michael Robert Tinsley, Coral Springs, FL (US)

( * ) Notice: Subject to any disclaimer, the term of this patent is extended or adjusted under 35 U.S.C. 154(b) by 0 days.

(21) Appl. No.: 14/814,788

(22) Filed: Jul. 31, 2015

Related U.S. Application Data

(60) Provisional application No. 62/193,767, filed on Jul. 17, 2015.

(51) Int. Cl.
| | | |
|---|---|---|
| A47B 81/00 | (2006.01) | |
| A47B 57/06 | (2006.01) | |
| A47B 57/34 | (2006.01) | |
| A47B 47/00 | (2006.01) | |

(52) U.S. Cl.
CPC ............ *A47B 81/00* (2013.01); *A47B 47/0083* (2013.01); *A47B 57/06* (2013.01); *A47B 57/34* (2013.01)

(58) Field of Classification Search
CPC ...... A47B 81/00; A47B 57/06; A47B 57/34; A47B 47/0083
USPC .......................... 211/1.57, 186, 187, 189–192
See application file for complete search history.

(56) References Cited

U.S. PATENT DOCUMENTS

| | | | | |
|---|---|---|---|---|
| 1,290,398 | A * | 1/1919 | Stevens ................ | A47B 47/028 |
| | | | | 108/188 |
| 1,712,858 | A * | 5/1929 | Tsuchii ................... | A47G 5/00 |
| | | | | 160/127 |
| 3,664,274 | A * | 5/1972 | Bustos ................. | A47B 57/265 |
| | | | | 108/107 |
| 3,760,534 | A * | 9/1973 | Choux ................... | A47G 7/041 |
| | | | | 211/85.23 |
| 4,074,812 | A * | 2/1978 | Skubic .................. | A47B 57/50 |
| | | | | 211/182 |
| 4,318,352 | A * | 3/1982 | Friedman ............ | A47B 57/265 |
| | | | | 108/107 |
| 4,593,826 | A * | 6/1986 | Bustos ................. | A47B 57/265 |
| | | | | 108/147.12 |
| 4,763,796 | A * | 8/1988 | Flum ........................ | A47F 1/12 |
| | | | | 108/187 |
| 4,763,799 | A * | 8/1988 | Cohn ..................... | A47B 31/00 |
| | | | | 108/147.13 |
| 4,811,670 | A * | 3/1989 | Kolvites .............. | A47B 57/265 |
| | | | | 108/107 |

(Continued)

OTHER PUBLICATIONS

Farmed Here, brochure, © FarmedHere® 2010-2012, pp. 1-5, Bedford Park, Illinois.

(Continued)

*Primary Examiner* — Brent W Herring
(74) *Attorney, Agent, or Firm* — Glenn E. Gold, P.A.

(57) ABSTRACT

A plant growing apparatus of a hydroponic and/or aeroponic plant growing system includes a support assembly and a pair of height control mechanisms. The support assembly includes a bottom platform, supported and mobilized by corner caster wheel devices, and top and intermediate platforms, vertically spaced apart from one another and the bottom platform by upright corner posts rigidly affixed at the corners of the bottom platform. The intermediate platform may be manually raised or lowered along the posts. The height control mechanisms are concurrently operable to raise or lower the top platform along the posts. In addition to the plant growing apparatus, the plant growing system also includes light modules supported by the top platform, plant grow cells supported by the intermediate platform below the light modules, and a water reservoir and pump on the bottom platform and connected in communication with the plant grow cells and height control mechanisms.

10 Claims, 9 Drawing Sheets

(56) References Cited

U.S. PATENT DOCUMENTS

| | | | | |
|---|---|---|---|---|
| 4,832,607 | A * | 5/1989 | Dorrell | G09F 15/00 211/133.3 |
| 4,852,501 | A * | 8/1989 | Olson | A47B 57/265 108/107 |
| 5,094,350 | A * | 3/1992 | Smock | A47B 57/04 211/150 |
| 5,577,623 | A * | 11/1996 | Bustos | A47B 57/00 108/180 |
| 5,950,846 | A * | 9/1999 | Duane | A47B 47/022 108/108 |
| 5,971,175 | A * | 10/1999 | Bustos | A47F 5/13 211/187 |
| 6,302,036 | B1 * | 10/2001 | Carson | A47F 1/12 108/107 |
| 6,364,137 | B1 * | 4/2002 | Glauth | A47F 5/137 211/126.9 |
| 6,378,712 | B1 * | 4/2002 | Sampl | A47B 57/06 108/107 |
| 6,680,200 | B2 | 1/2004 | Everett | |
| 6,974,036 | B2 * | 12/2005 | Wyatt | A47B 96/1408 211/189 |
| 7,857,329 | B2 * | 12/2010 | Cai | A47B 31/00 211/134 |
| 8,042,477 | B2 * | 10/2011 | Lee | A47B 57/54 108/109 |
| 8,151,518 | B2 | 4/2012 | Adams et al. | |
| 8,251,233 | B1 * | 8/2012 | Biglow | A47F 1/12 211/187 |
| 8,267,261 | B2 * | 9/2012 | Vanderhoek | A01G 9/143 108/143 |
| 2003/0121874 | A1 * | 7/2003 | Koester | B62B 3/006 211/187 |
| 2004/0251226 | A1 * | 12/2004 | Yang | A47B 57/40 211/187 |
| 2007/0125737 | A1 * | 6/2007 | O'Reilly | A47B 47/045 211/186 |
| 2008/0230502 | A1 * | 9/2008 | Poortvliet | B23P 19/04 211/187 |
| 2010/0059466 | A1 * | 3/2010 | Tanner | A47B 51/00 211/134 |
| 2011/0219683 | A1 | 9/2011 | Sutton | |
| 2012/0054061 | A1 | 3/2012 | Fok et al. | |
| 2012/0060416 | A1 | 3/2012 | Brusatore | |
| 2012/0199707 | A1 * | 8/2012 | Ortega | A47B 13/06 248/165 |
| 2012/0279127 | A1 * | 11/2012 | Yusibov | A01G 31/06 47/62 N |
| 2015/0027548 | A1 | 1/2015 | Moriarty | |
| 2015/0096950 | A1 * | 4/2015 | Engel | A47B 46/00 211/90.02 |
| 2015/0320206 | A1 * | 11/2015 | Jacob | F25D 25/02 211/187 |
| 2015/0342133 | A1 * | 12/2015 | Nakajima | A01G 31/02 47/62 R |
| 2016/0037913 | A1 * | 2/2016 | Franck | A47B 57/20 211/208 |

OTHER PUBLICATIONS

Jeff Wells, "Indoor Farming: Future Takes Root in Abandoned Buildings, Warehouses, Empty Lots & High Rises," © Copyright 2015 IBT Media Inc., US Edition, Thursday, Apr. 9, 2015 as of 9:30 AM EDT, pp. 1-16.

Harwood, Ed, "Warehouses to Urban Farms", article, Environment, Land Use, World, Sep. 27, 2010, pp. 1-9.

The PLANT, "Aquaponics", newsletter, © 2015 The PLANT, Chicago, Illinois, pp. 1-3.

Paul Clarke, Vertical Gardening Goes High-Tech and Large-Scale, article, Walden Labs, © 2015, Lakewood, Colorado, pp. 1-8.

* cited by examiner

PLANT GROWING HEAVY WEIGHT BEARING SUPPORT ASSEMBLY, APPARATUS AND SYSTEM

CROSS REFERENCE TO RELATED APPLICATION

This U.S. non-provisional patent application claims the benefit of U.S. provisional patent application No. 62/193,767, filed on Jul. 17, 2015, the entire contents of which are incorporated by reference herein.

FIELD OF THE INVENTION

The present invention relates generally to indoor farming, and more particularly, is concerned with a high load-bearing modular support assembly, apparatus and system, for enabling and facilitating flexible, scalable and dynamic, hydroponic and/or aeroponic indoor vertical farming.

BACKGROUND OF THE INVENTION

There is an increasingly popular view that the Earth's population growth will outstrip resources essential to food production within the next 30 years and, furthermore, that upwards of 80 percent of this additional population will primarily reside within urban centers. Usable farmland and fresh water supplies are being depleted at an ever-increasing pace. Presently, the United States is the largest producer of food crops in the world. The United States' agricultural industry has created most of the innovations responsible for today's modern farming practices. But, this has come at a cost, with innovation-driven farm practices responsible for many of the most pressing issues surrounding food safety and production sustainability. Today, a vast majority of foods are produced that are over-processed, loaded with harmful chemicals, and virtually devoid of nutritional value and taste. Therefore, it comes as no surprise that efforts are now heavily redirected away from the present deleterious farming practices which predominantly take place outdoors away from our cities.

Indoor farming within city boundaries—and, more particularly, indoor vertical farming—is not new. However, its growth has been stymied and it has failed to gain the traction necessary for mainstream appeal and acceptance. Despite the growing desire for organic foods and the popularity of hydroponic growth of food plants, most manifestations of indoor vertical farming have been relatively small, spotty individual efforts, such as, for example, greenhouses on rooftops or perhaps spread across a few acres of ground, or crude setups in relatively small warehouses. These limited efforts are at least partly due to underdeveloped strategies resulting from narrowly-focused thinking.

At the same time, it is well known that many cities have excessive inventories of inactive commercial and residential buildings (e.g. office buildings, warehouse complexes, apartment complexes, strip malls, old hotels and the like) and it would be highly desirable to see them revitalized into useful establishments. It would seem that the development of technologies that would enable these buildings to support growth of a wide variety of farm produce would provide substantial economic benefits in the form of jobs that cannot be exported or outsourced, and sustainability benefits in terms of enhanced food security and safety.

Many hydroponic growing systems have been developed outdoors within greenhouses or similar structures. In fact, it is likely that at least some individuals have successfully attempted to create indoor plant growth systems that function indoors where they are not vulnerable to insects and vermin, adverse weather conditions, and utilize artificial lighting so that they are not reliant on natural lighting from Mother Nature. However, a major obstacle remains when it comes to the challenge of economically beneficial conversion of such excessive indoor spaces for creating indoor vertical farming. That is, until now, there has been a lack of adequate equipment having the necessary characteristics, such as high load-bearing capability (enabling growth of heavier vegetables, potatoes, etc.), highly-efficient use of space, and a flexible design lending itself to scalability, which would greatly facilitate implementation of plant growing modules that could be easily transported from location to location along a support surface (e.g. an underlying floor), combinable to form optimized plant growing systems, and easily disassembled and reconfigured, or transformed, for maximizing efficient implementation across myriad varying application-specific pre-existing indoor space configurations.

Accordingly, there remains a need in the farming science and industry arts for an innovation that would overcome the aforementioned deficiencies and problems that remain unsolved—and thereby retard the implementation of indoor vertical farming—while also serving to revitalize abandoned and/or inactive commercial and residential buildings, and simultaneously creating jobs.

SUMMARY OF THE INVENTION

The present invention is directed to an innovation that overcomes the aforementioned, as-of-yet unsolved, deficiencies and problems, via the provision of a high weight-bearing plant growing support assembly, apparatus and system enabling and facilitating a flexible and scalable dynamic indoor vertical farming system, which will foster revitalization of abandoned and/or inactive commercial and residential buildings.

In one aspect of the present invention, a plant growing support assembly includes:

a bottom platform having a rolling mechanism on an underside thereof to facilitate rolling movement along an underlying support surface;

a plurality of vertically-oriented elongated posts arranged parallel and spaced-apart from one another, and extending upwards from corners of an upper surface of the bottom platform;

an intermediate platform positioned above said bottom platform and spaced-apart therefrom, said intermediate platform having a plurality of horizontally-oriented rigid linear members, each member having opposite ends, the ends of each pair of adjacent members interconnected to one another via a coupler such that said plurality of rigid linear members form a contiguous rigid peripheral framework, each coupler defining a vertical opening extending completely therethrough for being slidably-received over an upper end of a corresponding one of said vertically-oriented elongated posts and lowered to a position such that the couplers are positioned within an intermediate portion of said vertically-oriented elongated posts, an interior rigid framework bounded by said contiguous rigid peripheral framework forming a matrix of interior openings, each opening spanned by a mesh panel;

a top platform having a plurality of horizontally-oriented rigid linear members, each member having opposite ends, the ends of each pair of adjacent members interconnected to one another via a coupler such that said plurality of rigid linear members form a contiguous rigid peripheral framework, each coupler defining a vertical opening extending completely therethrough for being slidably-received over an upper end of a corresponding one of said vertically-oriented elongated posts, an interior rigid framework forming a matrix of interior openings, each opening spanned by a light-emitting module;

wherein said vertically-oriented elongated posts each have a series of spaced-apart apertures formed therein at equal vertical positions along the posts such that different sets of the apertures, being aligned with one another, are defined at different heights along the posts;

wherein the couplers of the top and intermediate platforms have respective apertures formed therethrough that align with respective ones of the different sets of the apertures of the posts; and wherein fasteners are fitted through selected aligned ones of the different sets of the apertures of the elongated posts and the apertures of the couplers so as to retain the top and intermediate platforms respectively at selected elevations along the corresponding upper and intermediate portions of the posts.

In another aspect of the present invention, the plant growing apparatus may include:

at least one platform height control mechanism extending between and mounted to upper end portions of a selected pair of the plurality of elongated posts that extend above a corresponding pair of the couplers of the top platform, said at least one height control mechanism coupled to the top platform at a respective one of the couplers disposed at one of a diagonally opposite one pair of the corners of the top platform such that the height control mechanism, operable to selectively raise or lower the top platform along the posts, interacts with the top platform to facilitate raising and lowering of the top platform along the posts;

wherein, the fasteners are fitted through the aligned ones of the apertures of the posts and couplers so as to retain the top and intermediate platforms respectively along corresponding upper and intermediate portions of the posts.

In another aspect of the present invention, the at least one platform height control mechanism may comprise a pair of platform height control mechanisms extending between and mounted to upper end portions of a selected pair platform height control mechanisms located at a diagonally opposite pair of the corners of the top platform so as to minimize potential binding of the top platform relative to the posts.

In still another aspect of the present invention, each of the pair of height control mechanisms of the plant growing apparatus may include:

an actuator having a main body coupled to the upper end of one of the elongated posts extending above one of a diagonally opposite other pair of the corners of the top platform;

a first pulley coupled to one end of the actuator being extendible and retractable from and toward the main body of the actuator;

a second pulley coupled to the upper end of one of upright posts extending through one of the diagonally opposite one pair of the corners of the top platform; and a cable connected at a first end to the one of the diagonally opposite one pair of the corners of the top platform, extending therefrom about and between the first and second pulleys and connected at a second end, being opposite to the first end, to the one end of the actuator such that concurrent operation of the actuators with one another to extend and retract the one end of each actuator and the first pulley of each actuator therewith, away from and toward the main body of the actuator results in the top platform being lowered and raised along the posts.

In yet another aspect of the present invention, a plant growing system may include:

an array of light modules supported by the top platform so as to emit light in a downward direction;

an intermediate platform of a rectangular configuration and having a plurality of corners and a plurality of couplers each being disposed and rigidly affixed at one of the corners and defining passages that slidably receive therethrough the posts and along corresponding intermediate portions thereof, the intermediate platform and the posts being connectible to one another so as to retain the intermediate platform along the corresponding intermediate portion of the posts;

an array of plant grow cells supported by the intermediate platform so as to receive the light emitted by the light modules disposed above the plant grow cells;

a pair of height control mechanisms each extending between and mounted to upper end portions of the elongated posts that extend above a corresponding pair of the couplers of the top platform, each of the pair of height control mechanisms being coupled to the top platform at a respective one of the couplers disposed at one of a diagonally opposite one pair of the corners of the top platform and being concurrently operable to selectively raise or lower the top platform, and the light modules therewith, along the posts away from and toward the array of plant grow cells supported by the intermediate platform; and a water reservoir and at least one pump for controlling operation of the reservoir and the height control mechanisms, the water reservoir and at least one pump being supported by the bottom platform and connected in communication with the array of plant grow cells and height control mechanisms.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF REPRESENTATIVE IMPLEMENTATIONS

Figure 1:
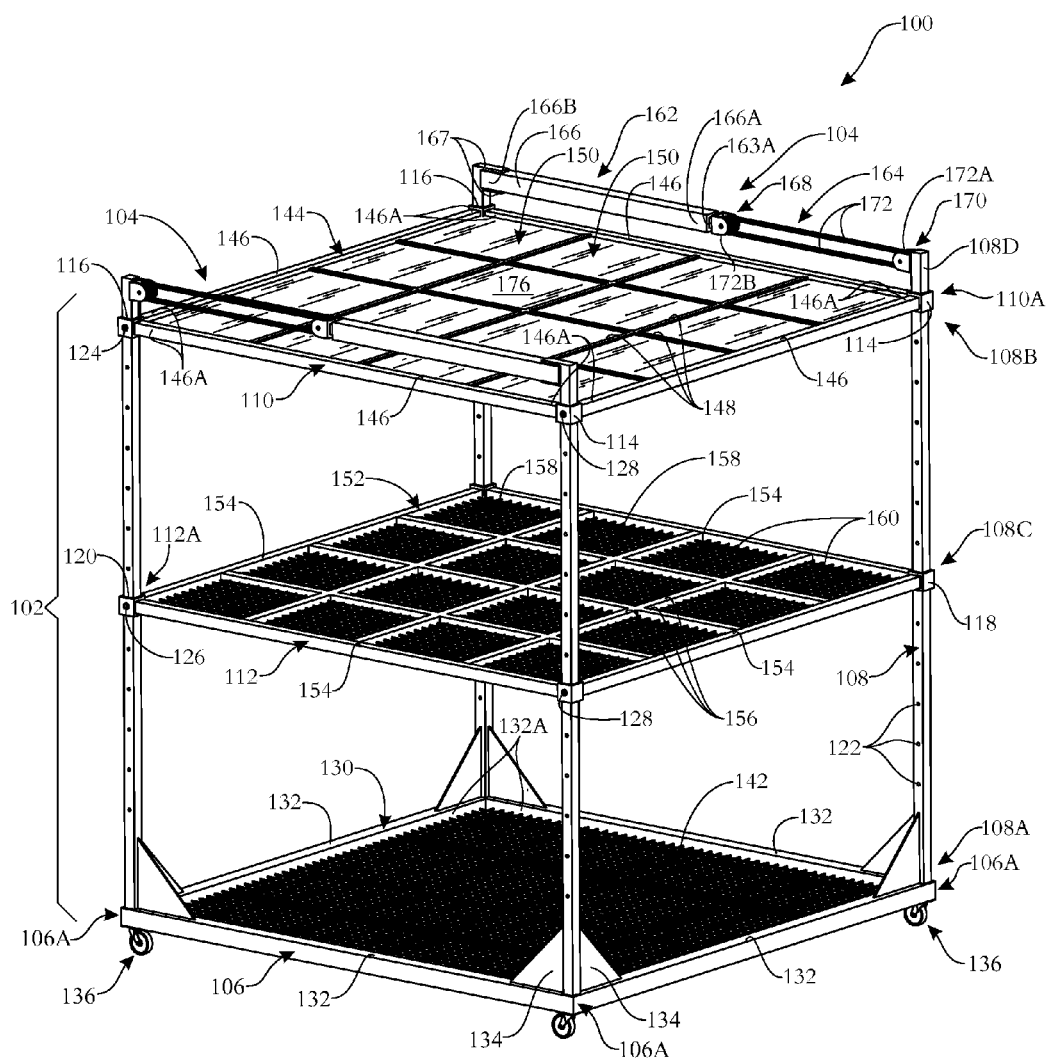
FIG. 1 presents a top isometric view of an exemplary embodiment of a plant growing apparatus in accordance with an aspect of the present invention.
Figure 2:
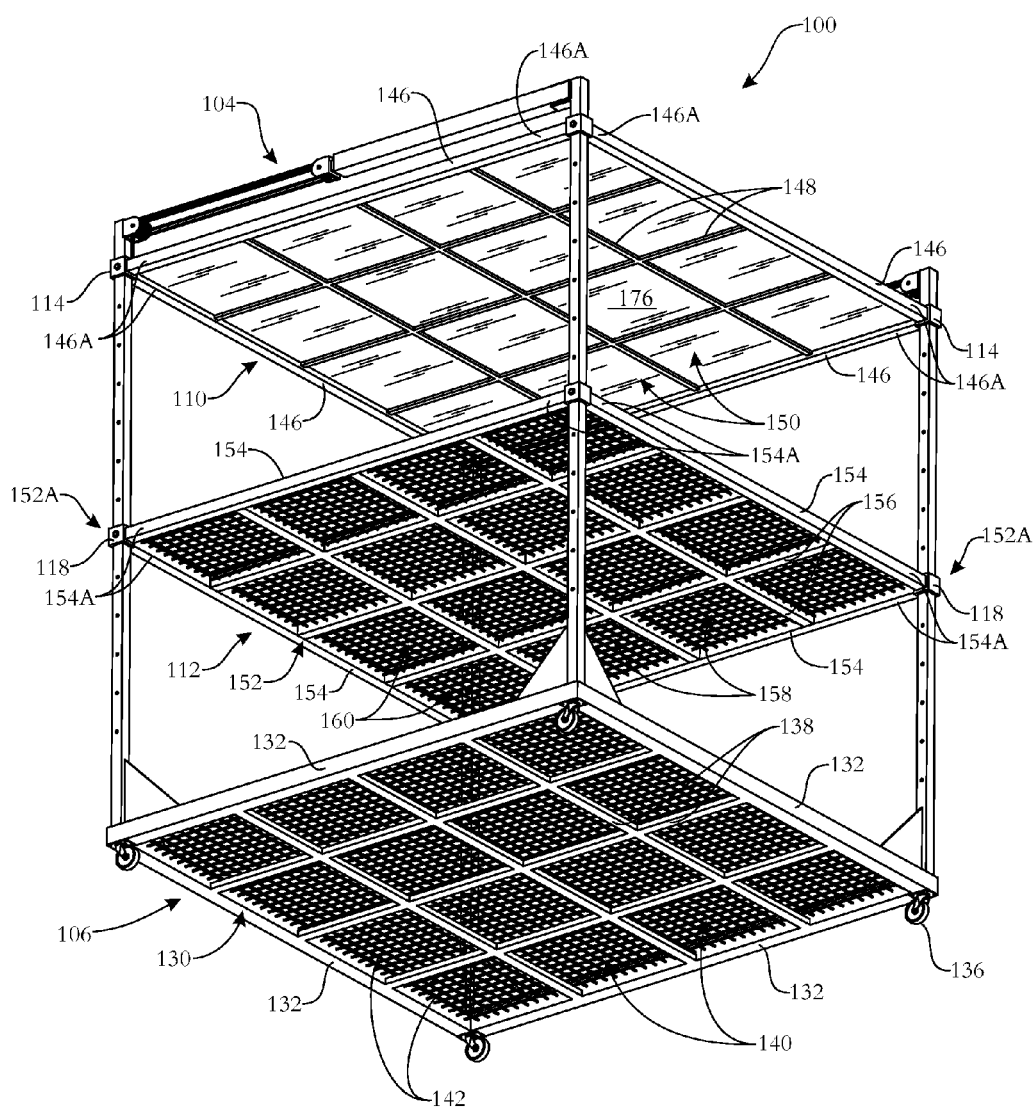
FIG. 2 presents a bottom isometric view of the apparatus originally introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now particularly to FIGS. 1 through 4, there is illustrated an exemplary implementation of a plant growing apparatus, generally designated 100, according to an aspect of the present invention. The plant growing apparatus 100 includes a plant growing support assembly 102, according to another aspect of the present invention, and a pair of height control mechanisms 104 incorporated with the support assembly 102. The support assembly 102 of the plant growing apparatus 100 includes a bottom platform 106, a plurality of vertically-disposed elongated posts 108, a top platform 110 and an intermediate platform 112 disposed between the upper/top and lower/bottom platforms. A plurality of elongated posts 108, and preferably four posts, are spaced-apart from one another and extend upright and generally parallel to one another. The posts 108 at their lower end portions 108A extend upwards from, and are affixed to, the bottom platform 106, preferably at respective spaced apart corners 106A thereof.

The top platform 110 has a plurality of spaced-apart couplers 114 disposed about elongated posts 108 and affixed at respective corners 110A of the top platform 110, which define passages 116 therethrough that slidably receive an uppermost length 108D of the upright corner posts 108 along corresponding upper portions 108B thereof. Similarly, the intermediate platform 112 has a plurality of spaced-apart couplers 118 disposed about an intermediate length 108C, or portion, of the elongated posts 108 affixed at respective corners 112A of the intermediate platform 112, which define passages 120 therethrough that slidably receive the upright corner posts 108 along corresponding intermediate portions 108C thereof.

Preferably, the upright, or vertically-disposed, corner posts 108 each have a respective series of apertures 122 formed therein at equal vertical spacing from one another along the posts 108, such that different sets of the apertures 122 (in this case sets of four apertures) aligned with one another are defined at varying heights along the posts 108. The couplers 114, 118 of the respective top and intermediate platforms 110, 112 have respective apertures 124, 126 formed therethrough that may be aligned with respective ones of the different sets of the apertures 124 of the upright corner posts 108 by raising and lowering the top and intermediate platforms 110, 112 relative to the posts 108. Also, a plurality of fasteners 128 are provided that fit through selected aligned ones of the different sets of the apertures 122 of the upright corner posts 108 and the apertures 124, 126 of the couplers 114, 118 of the top and intermediate platforms 110, 112 so as to retain the top and intermediate platforms 110, 112 respectively at user-selected elevations along the corresponding upper and intermediate portions 108B, 108C of the posts 108.

More particularly, the bottom platform 106 of the support assembly 102 includes a peripheral frame 130 formed by a plurality of elongated members 132—preferably four members disposed in a rectangular configuration and rigidly affixed to one another at adjacent end portions 132A thereof so as to form the plurality of corners 106A of the bottom platform 106. The support assembly 102 may also have a plurality of braces 134 and a plurality of caster wheel devices 136. Each brace 134, which, by way of example but not limitation, may be a flat triangular shaped metal plate (as shown), is disposed adjacent to one of the corners 106A of the bottom platform 106 and rigidly affixed thereto, and forms right angles between the lower end portion 108A of one of the upright corner posts 108 and a respective end portion 132A of one of the elongated members 132 of the peripheral frame 130 of the bottom platform 106. Each caster wheel device 136 is disposed below and mounted to one of the corners 106A of the bottom platform 106 so as to mobilize the support assembly 102 for movement relative to a support surface (not shown). The bottom platform 106 also has an interior framework 138 spanning between and rigidly affixed to the elongated members 132 of the peripheral frame 130 of the bottom platform 106. The interior framework 138 of the bottom platform 106 may have a lattice structure defining an array of openings 140 through the bottom platform 106 and a mesh 142 affixed to the interior framework 138 and extending across the openings 140.

The top platform 110 of the support assembly 102 includes a peripheral frame 144 formed by a plurality of elongated members 146 (preferably four, as shown), each of the individual members having opposite ends 146A welded, or otherwise fixedly attached, to couplers 114. Preferably, the elongated members 146 are disposed in a rectangular configuration (as shown) and together with the couplers 114 rigidly affixed to respective end portions 146A of adjacent pairs of the elongated members 146, form the plurality of corners 110A of the top platform 110. As will be apparent to those skilled in the art, variations of the rectangular geometry shown in the Figures are contemplated. Accordingly, although it is preferable to incorporate four peripheral members to form a rectangular periphery, variations on the quantity of peripheral members 132, 146, 154 defining the corresponding geometry of the respective peripheral frameworks 130, 144, 152 may be used to construct the respective lower/bottom platform 106, upper/top platform 110 and intermediate platform 112. The top platform 110 also has an interior framework 148 spanning between and rigidly affixed to the elongated members 146 of the peripheral frame 144. The interior framework 148 of the top platform 110 has a lattice structure defining an array of openings 150 through the top platform 110.

The intermediate platform 112 of the support assembly 102 includes a peripheral frame 152 formed by a plurality of elongated members 154 (e.g., preferably four members, as depicted in the accompanying Figures). The elongated members 154 are disposed in a rectangular configuration and, together with the couplers 118, are rigidly affixed to respective end portions 154A of adjacent pairs of the elongated members 154, to form the plurality of corners 112A of the intermediate platform 112. The intermediate platform 112 also has an interior framework 156 spanning between and rigidly affixed to the elongated members 154 of the peripheral frame 154. The interior framework 156 of the intermediate platform 112 has a lattice structure defining an array of openings 158 through the intermediate platform 112 and a mesh 160 affixed to the interior framework 156 and extending across, or spanning, the openings 158.

By way of example, but not limitation, the bottom platform 106 may be disposed spaced above the support surface (not shown), and in a horizontal plane, by the plurality of caster wheel devices 136. Also, by way of example but not limitation, the respective top and intermediate platforms 110, 112 are supported at different elevations above the bottom platform 106, and thus the support surface, and along and in substantially parallel horizontal planes by the upright corner posts 108. The elongated members 132, 146 and 154 of the respective bottom, top and intermediate platforms 106, 110 and 112, and the corresponding interior frameworks 138, 148 and 156 thereof, may, by way of example but not limitation, be in the form of elongated hollow bars or rods of rectangular cross-section constructed of steel or a similar rigid material, such as one-by-one inch square bars. The mesh 142, 160 of the respective bottom and intermediate platforms 106, 112 may, by way of example but not limitation, be in the form of squares of one-half inch (½") stainless steel material or the like. By of example but not limitation, the upright corner posts 108 may be in the form of elongated hollow bars or rods of rectangular cross-section made of steel or the like, such as one-by-one inch, two-by-two inch or three-by-three inch square bars. The lattice structure of the interior frameworks 138, 148 and 156 may by way of example but not limitation be four-by-four interior square frames. The couplers 114, 118 may by way of example but not limitation be comprised of hollow annular collars constructed from steel or the like, of such size to accommodate the bars or rods forming the posts 108.

Each of the pair of height control mechanisms 104 of the plant growing apparatus 100 extends between and is mounted to upper end portions 108D of a selected adjacent pair of the plurality of upright corner posts 108 extending beyond a corresponding pair of the couplers 114 of the top platform 110. Also, each of the height control mechanisms 104 is coupled to the top platform 110 at a respective one of the couplers 114 disposed at one of a diagonally opposite pair of the corners 110A of the top platform 110. Thus, the height control mechanisms 104, being concurrently operable to selectively raise or lower the top platform 110 along the upright corner posts 108, apply respective lifting forces at one of the diagonally opposite pairs of corners 110A of the top platform 110, so as to minimize possible binding of the top platform 110 relative to the upright corner posts 108 during lowering or raising of the top platform 110 along the length of the posts 108.

More particularly, each of the height control mechanisms 104 of the plant growing apparatus 100 includes an actuator 162 and a pulley-and-cable arrangement 164. Each actuator 162 has a main body 166 received between and fixedly coupled to a pair of cantilevered flanges 167 extending inwardly from the uppermost length/end 108D of the upright corner posts 108 extending above one of the diagonally-opposite one pair of the corners 110A of the top platform 110. Likewise, each height control mechanism 104 is fixedly coupled (at second pulley 170) to an opposing pair of cantilevered flanges 171 extending inwardly from the uppermost length/end 108D of an adjacent uppermost length/end 108D of an adjacent post 108. Each pulley-and-cable arrangement 164 includes a first pulley 168, a second pulley 170 and a length of cable 172. The first pulley 168 is coupled to the one end 162A of the actuator 162 and is extendable from and retractable towards the main body 166 of the actuator 162. The second pulley 170 is coupled to the upper end 108D of one of the upright corner posts 108 extending through one of the diagonally opposite one pair of the corners 110A of the top platform 110. The cable 172 is connected at a first end 172A to the one of the diagonally opposite one pair of the corners 110A of the top platform 110, extends therefrom about and between the first and second pulleys 168, 170 and is connected at a second end 172B, being opposite to the first end 172A, to the one end 162A of the actuator 162 such that the concurrent operation of the actuators 162 to extend and retract the one end 162A of each actuator 162 and the first pulley 168 therewith, away from and toward the main body 166 of the actuator 162, results in the top platform 110 being either lowered or raised along the length of the posts 108. The actuators 162 may be operated, by way of example but not limitation, using either hydraulic or pneumatic pressure.

The operation and function of motor driven linear actuator or pulleys rotated by drive cords or belts is well known. For example, descriptions of various conventional means for employing such arrangements using a power unit to extend and retract a cord to move an attached assembly is clearly described and shown in U.S. Pat. No. 4,915,461 to Kingsborough, U.S. Pat. No. 6,367,898 to Jobe, and U.S. Patent Application Publication No. 20130241384, which are all incorporated by reference herein in their entireties. Furthermore, various mechanisms are commercially available for producing controlled movement of a mechanical element or a connecting point thereof. For example, hydraulic and pneumatic cylinders are commonly used to produce forceful movement of arms and other mechanical elements of numerous mechanical, prosthetic, and or robotic devices. By way of example, commercially-available pneumatic and hydraulic linear actuators can be found on the following Internet websites: www.robotshop.com; www.greencocylinders.com; www.directindustry.com; and www.thomsonlinear.com.

Figure 3:
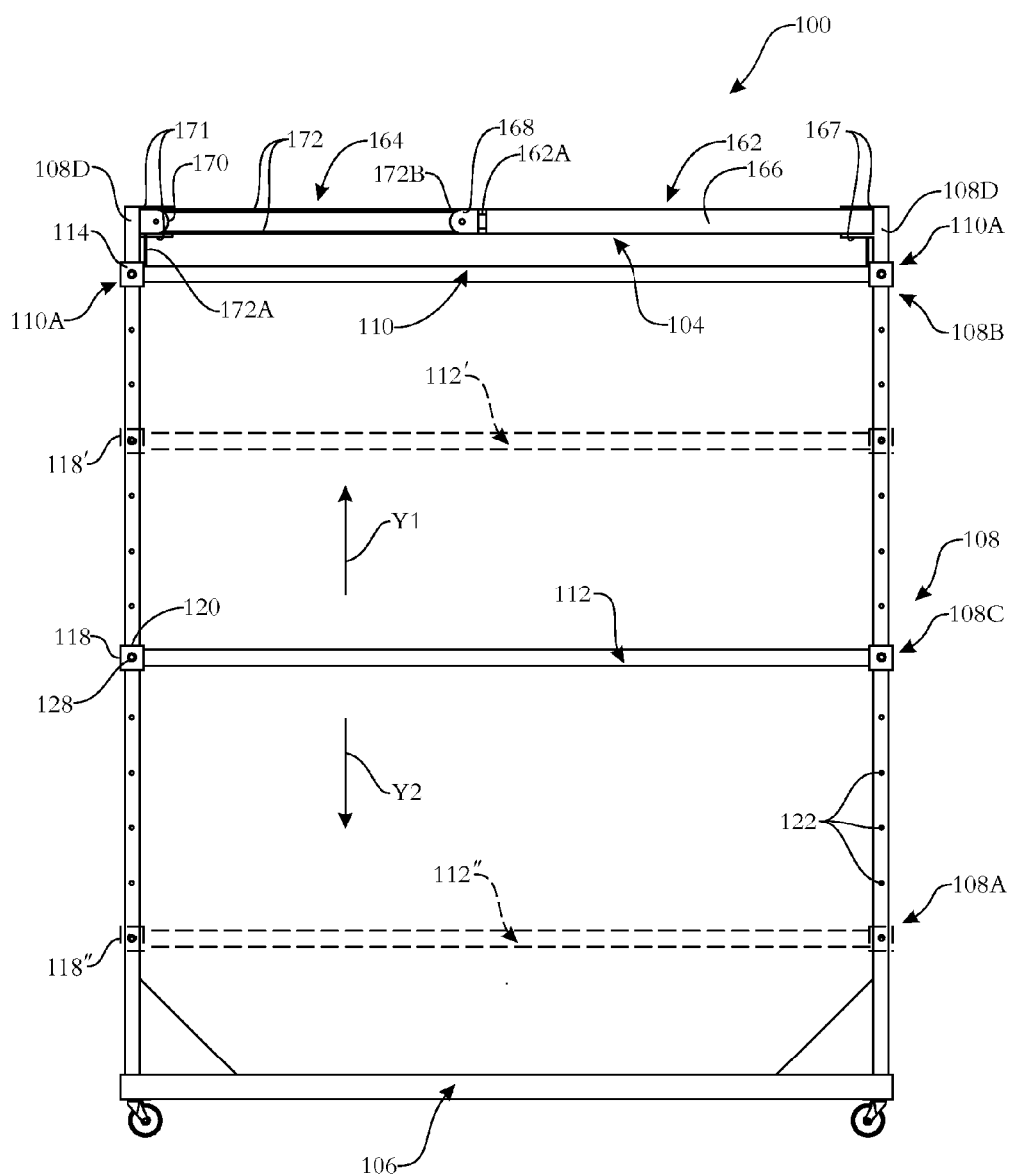
FIG. 3 presents a side elevation view of the apparatus originally introduced in FIG. 1, illustrating examples of positions to which a load-bearing intermediate platform of the apparatus can be manually raised or lowered.
Figure 4:
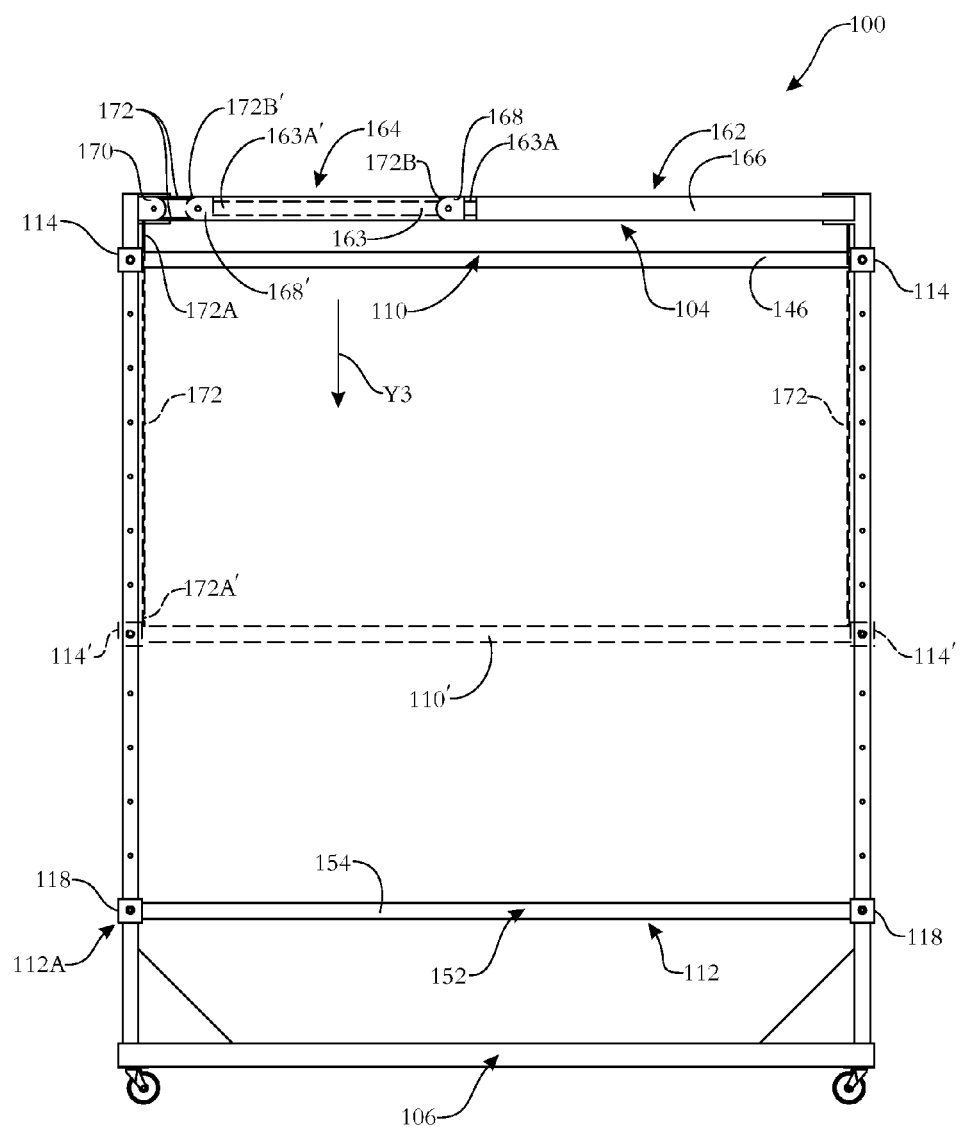
FIG. 4 presents a side elevation view of the apparatus originally introduced in FIG. 1, illustrating an example of a position to which a light-bearing top platform of the apparatus can be lowered by concurrent operation of a pair of height control mechanisms.

As best shown in FIG. 3, by action of the actuators 162 intermediate platform 112, along with corresponding couplers 118, can be vertically translated (as shown by directional arrow Y1) upward to a raised position identified by intermediate platform 112' and couplers 118', through extension of cable length 172. Likewise, in similar fashion, intermediate platform 112, along with corresponding couplers 118, can be translated downward (as shown by directional arrow Y2) to a lowered position identified by intermediate platform 112" and couplers 118", through retraction of cable length 172. In similar fashion, as best depicted by FIG. 4, upper platform 110 can be vertically translated (as shown by directional arrow Y3) along with corresponding couplers 114, for example to a lowered position as indicated by upper platform 110' and couplers 114'.

Referring now primarily to FIGS. 5-9, there is illustrated a plant growing system, generally designated 174, in accordance with another aspect of the present invention. The plant growing system 174 basically includes the support assembly 102 and the pair of height control mechanisms 104 of the plant growing apparatus 100, as described in detail previously above. To summarize, the support assembly 102 includes the bottom platform 106, supported and mobilized by the corner caster wheel devices 136, and the top and intermediate platforms 110, 112, vertically spaced apart from one another and the bottom platform 106 by the upright corner posts 108, being rigidly affixed at the corners 106A of the bottom platform 106. The intermediate platform 112 and the posts 108 are connectible to one another so as to retain the intermediate platform 112 at a selected elevation above the bottom platform 106 and along the intermediate portion 108C of the posts 108. Also, the intermediate platform 112 may be disconnected from the posts 108 to manually raise or lower the intermediate platform 112 relative to the posts 108. The pair of height control mechanisms 104 are concurrently operable to raise or lower the top platform 110 relative to the posts 108 to a selected elevation at which the top platform 110 is then connectible to the posts 108 to retain the top platform 110 at the selected elevation above the bottom platform 106 and along the upper portions 108B of the posts 108.

Figure 5:
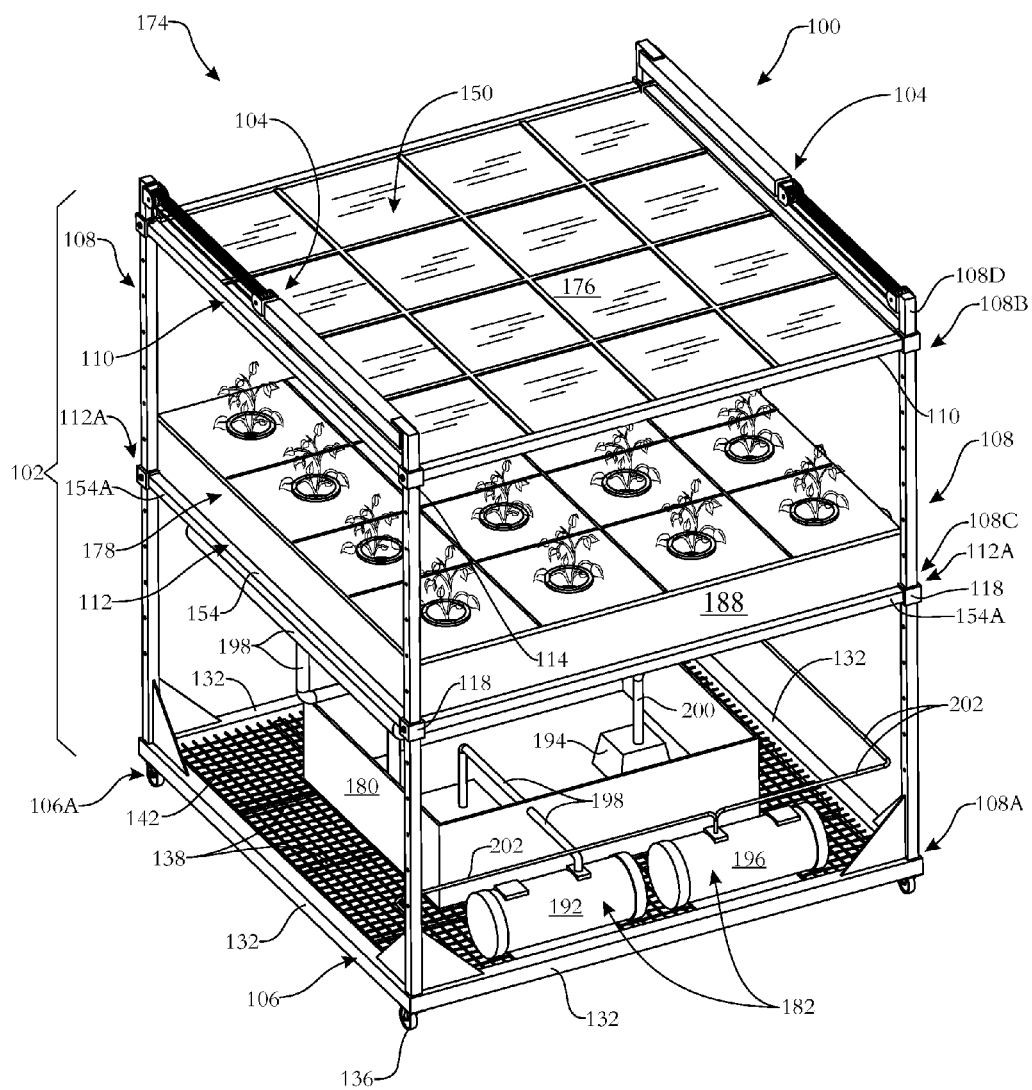
FIG. 5 presents a top isometric view of an exemplary embodiment of a plant growing system in accordance with another aspect of the present invention.
Figure 6:
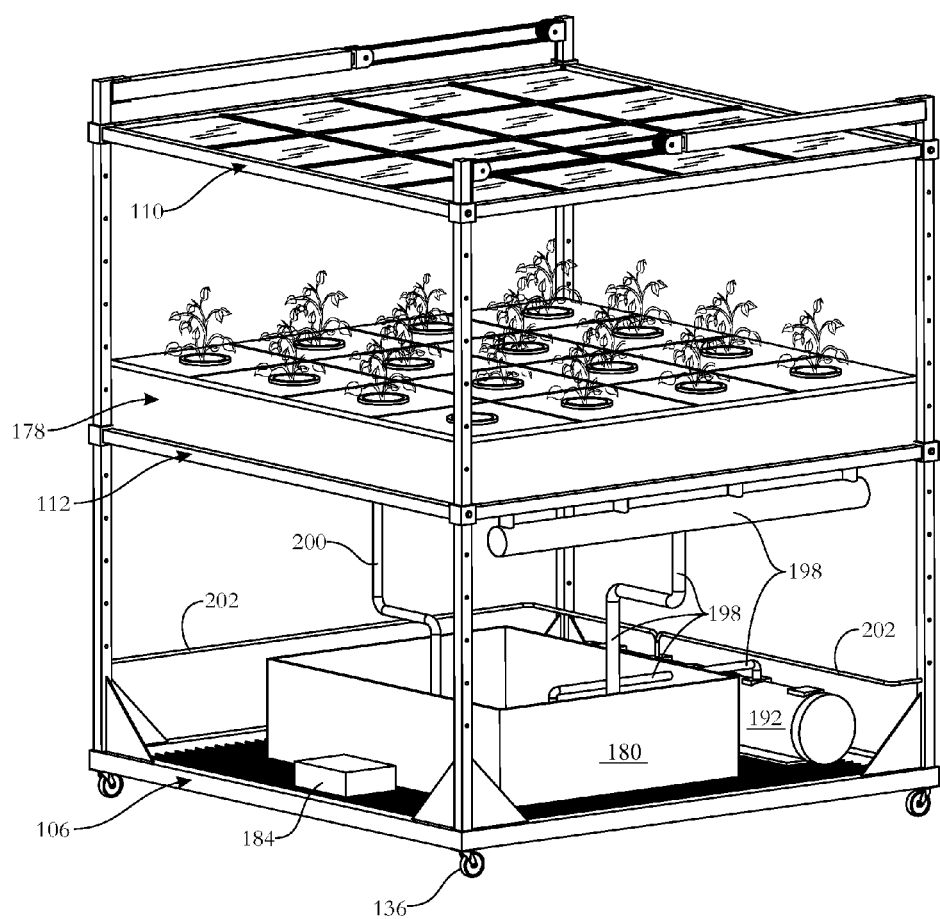
FIG. 6 presents another top isometric view of the system originally introduced in FIG. 5, the system being illustrated at an orientation rotated ninety degrees from that in FIG. 5.
Figure 7:
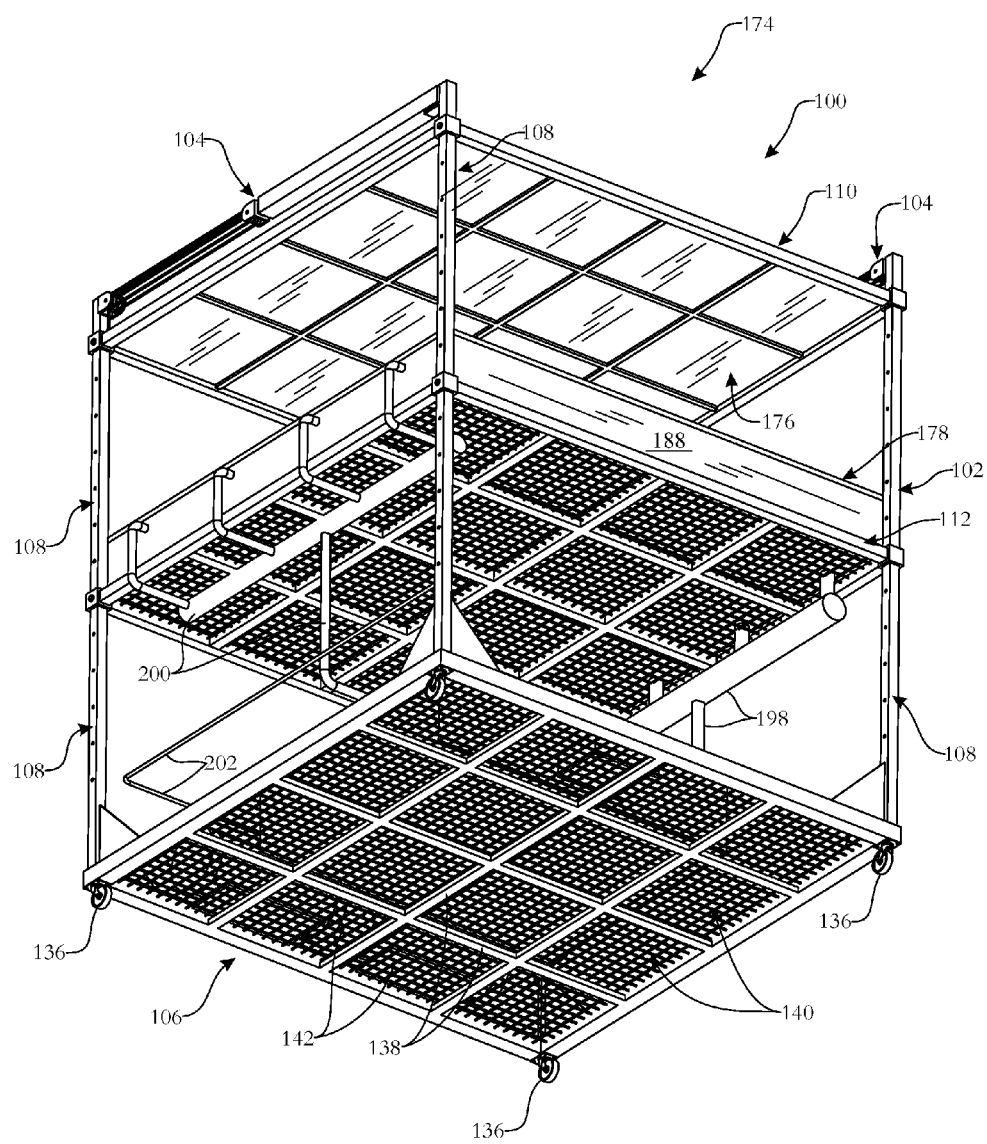
FIG. 7 presents a bottom isometric view of the system as originally introduced in FIG. 5.
Figure 8:
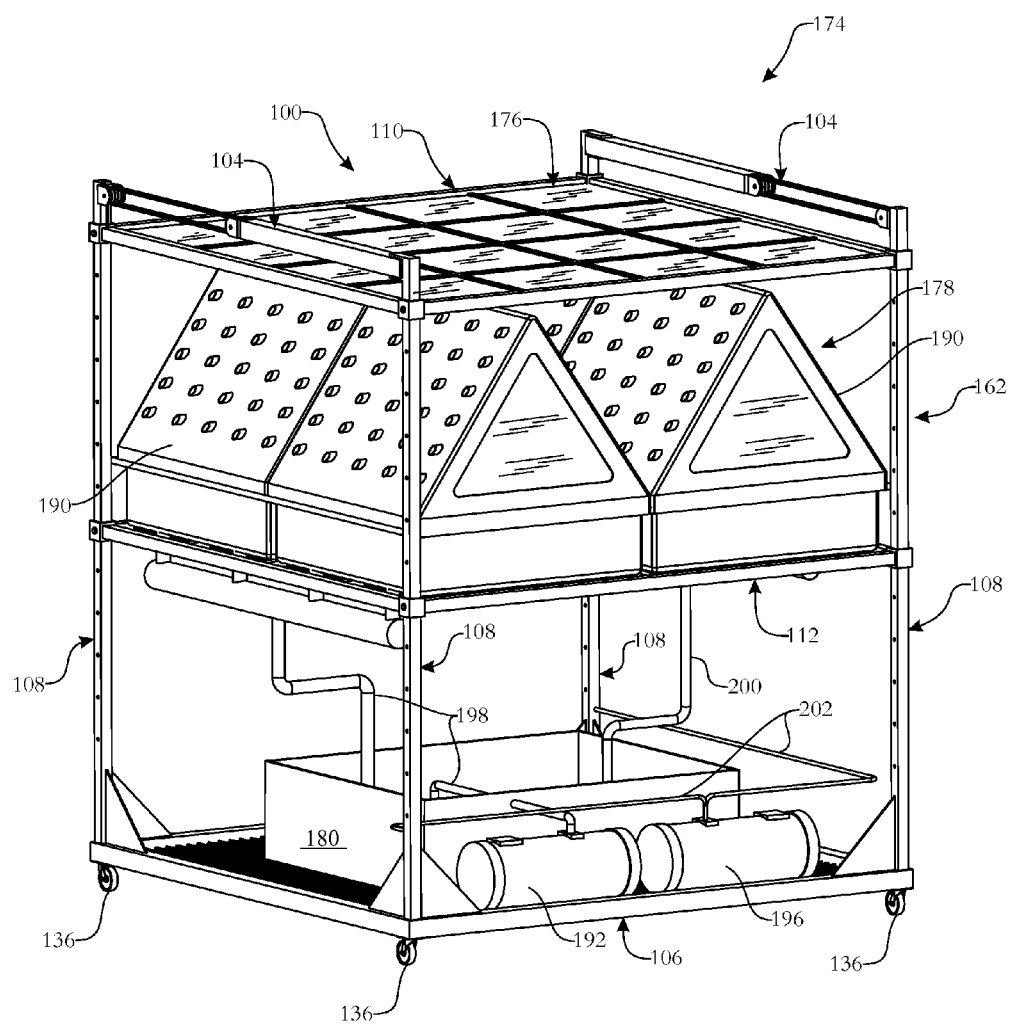
FIG. 8 presents an top isometric view of an alternate embodiment of plant grow cells of the plant growing system.
Figure 9:
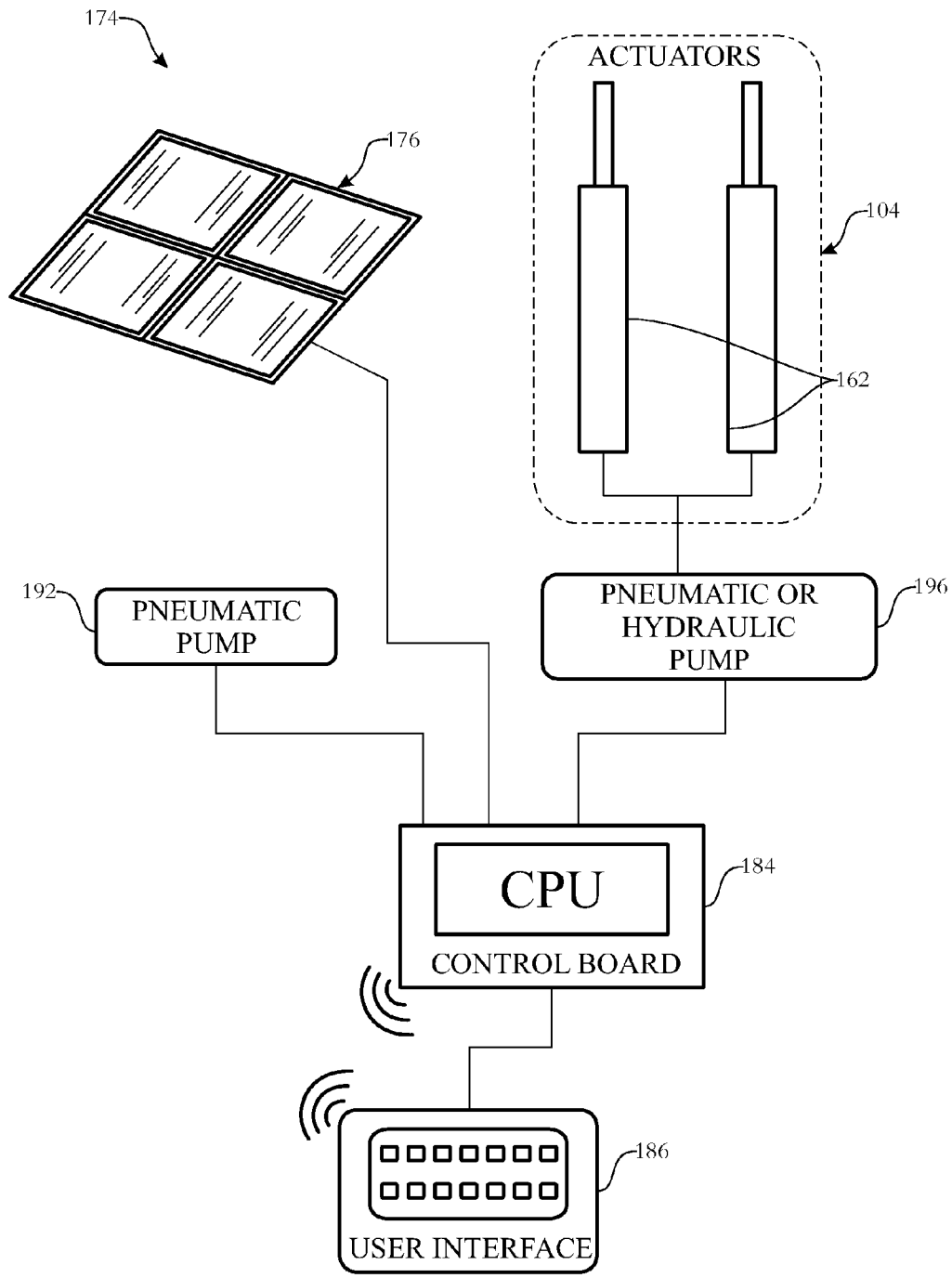
FIG. 9 presents a diagram of the cooperative relationship between the operational components of the systems of FIGS. 5 and 8.

In addition to the plant growing apparatus 100, the plant growing system 174 may also include an array of light modules 176, an array of plant grow cells (or racks) 178, a water and nutrient reservoir 180, one or more pumps 182, a control board 184 and a user interface 186. The array of light modules 176, which may, by way of example but not limitation, be Light Emitting Diode (LED) light panels, are supported on the interior framework 148 of the top platform 110 so as to emit light in a downward direction. The array of plant grow cells 178, which may, by way of example but not limitation, be tray grow cells 188, as seen in FIGS. 5-7, or pyramidal grow cells 190, as seen in FIG. 8, are supported on the interior framework 156 and mesh 160 of the intermediate platform 112 below the light modules 176 so as to receive the light emitted by the light modules 176 disposed above the plant grow cells 178. The reservoir 180, the one or more pumps 182 and the control board 184 may be supported on the interior framework 138 and mesh 142 of the bottom platform 106. The one or more pumps 182 may include an air or pneumatic pump 192, a nutrient pump 194 and a pneumatic or hydraulic pump 196. A water supply line 198 extends respectively between the pump 192, the reservoir 180 and the array of plant grow cells 178. A nutrient supply line 200 extends respectively between the pump 194 and the plant grow cell array 178. The pump 196 communicates with the height control mechanisms 104, such as via wires 202 running through hollow interiors of the upright corner posts 108. By way of example but not limitation, a significant space, such as seven feet, may be provided between the top and intermediate platforms 110, 112 so as to enable the adjustment of the desired spacing therebetween to accommodate, for example, the various hardware supported upon the lower platform 106, the tray grow cells 188 on the intermediate platform 112, etc. Significantly, the platforms 106, 110, 112 are constructed to have very high load bearing capabilities, such as, by way of example but not limitation, loads of up to 2000 pounds or more, which enable application of the support assembly 102 for the growth of a wide variety of farm produce. Further, the reservoir 180 may, by way of example but not limitation, hold a purified, chilled, volume of water enhanced with 35% food grade hydrogen peroxide.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A plant growing apparatus, comprising:

a bottom platform;

a plurality of elongated posts being spaced apart from one another and disposed about and affixed to said bottom platform so as to extend upright therefrom and parallel to one another;

a top platform having a plurality of couplers and a peripheral frame formed by a plurality of elongated members disposed in a rectangular configuration and together with said couplers, being rigidly affixed to respective end portions of adjacent pairs of said elongated members of said peripheral frame, forming a plurality of corners of said top platform, said couplers defining passages therethrough that slidably receive said elongated posts along corresponding upper portions thereof;

an intermediate platform having a plurality of couplers and a peripheral frame formed by a plurality of elongated members disposed in a rectangular configuration and together with said couplers, being rigidly affixed to respective end portions of adjacent pairs of said elongated members of said peripheral frame, forming a plurality of corners of said intermediate platform, said couplers defining passages therethrough that slidably receive said elongated posts along corresponding intermediate portions thereof; and a pair of height control mechanisms each extending between and mounted to upper end portions of a selected pair of said plurality of elongated posts that extend above a corresponding pair of said couplers of said top platform, each of said pair of height control mechanisms being coupled to said top platform at a respective one of said couplers disposed at one of a diagonally opposite one pair of said corners of said top platform such that said height control mechanisms, being concurrently operable to selectively raise or lower said top platform along said posts, interact with said top platform at said diagonally opposite one pair of said corners of said top platform so as to minimize potential binding of said top platform relative to said posts;

wherein said elongated posts have apertures formed therein at equal vertical spacing along said posts such that different sets of said pluralities of apertures, being aligned with one another, are disposed at different heights along said posts;

also wherein said couplers of said peripheral frames of said top and intermediate platforms have respective apertures formed therethrough that align with respective ones of said different sets of pluralities of said apertures of said posts; and further wherein fasteners are fitted through said aligned ones of said apertures of said posts and couplers so as to retain said top and intermediate platforms respectively along corresponding upper and intermediate portions of said posts.

2. The apparatus of claim 1 further comprising a plurality of caster wheel devices being spaced apart and disposed below and mounted to said bottom platform so as to mobilize said apparatus to create a non-fixed floor position of said plant growing apparatus.

3. The apparatus of claim 1 wherein each of said pair of height control mechanisms comprises:

an actuator having a main body coupled to said upper end of one of said elongated posts extending above one of a diagonally opposite other pair of said corners of said top platform;

a first pulley coupled to one end of said actuator being extendible and retractable from and toward said main body of said actuator;

a second pulley coupled to said upper end of one of upright posts extending through one of said diagonally opposite one pair of said corners of said top platform; and a cable connected at a first end to said one of said diagonally opposite one pair of said corners of said top platform, extending therefrom about and between said first and second pulleys and connected at a second end, being opposite to said first end, to said one end of said actuator such that concurrent operation of said actuators with respect to one another to extend and retract said one end of each actuator and said first pulley of each actuator therewith, away from and toward said main body thereof results in said top platform being lowered and raised along said posts.

4. A plant growing system, comprising:

a bottom platform;

a plurality of elongated posts being spaced apart from one another and disposed about and affixed to said bottom platform so as to extend upright therefrom and parallel to one another;

a top platform of a rectangular configuration and having a plurality of corners and a plurality of couplers each being disposed and rigidly affixed at one of said corners and defining passages that slidably receive therethrough corresponding upper portions of said posts;

an array of light modules supported by said top platform so as to emit light in a downward direction;

an intermediate platform of a rectangular configuration and having a plurality of corners and a plurality of couplers each being disposed and rigidly affixed at one of said corners and defining passages that slidably receive therethrough said posts and along corresponding intermediate portions thereof, said intermediate platform and said posts being connectible to one another so as to retain said intermediate platform along said corresponding intermediate portion of said posts;

an array of plant grow cells supported by said intermediate platform so as to receive the light emitted by said light modules disposed above said plant grow cells;

a pair of height control mechanisms each extending between and mounted to upper end portions of said elongated posts that extend above a corresponding pair of said couplers of said top platform, each of said pair of height control mechanisms being coupled to said top platform at a respective one of said couplers disposed at one of a diagonally opposite one pair of said corners of said top platform and being concurrently operable to selectively raise or lower said top platform, and said light modules therewith, along said posts away from and toward said array of plant grow cells supported by said intermediate platform; and a water reservoir and at least one pump for controlling operation of said reservoir and said height control mechanisms, said water reservoir and at least one pump being supported by said bottom platform and connected in communication with said array of plant grow cells and height control mechanisms.

5. The system of claim 4 further comprising a control board coupled in communication with said at least one pump and light modules, and a user interface coupled in communication with said control board, said user interface and control board being configured to control operation of said pump, actuators and light modules.

6. The system of claim 4 further comprising a plurality of caster wheel devices being spaced apart and disposed below and mounted to said bottom platform so as to mobilize said system.

7. The system of claim 4 wherein said top platform also has a peripheral frame formed by a plurality of elongated members, and an interior framework spanning between and rigidly affixed to said elongated members of said peripheral frame and having a lattice structure defining an array of openings through said top platform and supporting said array of light modules on said lattice structure in alignment with said array of openings.

8. The system of claim 4 wherein said intermediate platform also has a peripheral frame formed by a plurality of elongated members, and an interior framework spanning between and rigidly affixed to said elongated members of said peripheral frame and having a lattice structure defining an array of openings through said intermediate platform and supporting said array of plant grow cells on said lattice structure of said top platform.

9. The system of claim 4 wherein said light modules are LED light panels.

10. The system of claim 4 wherein said plant grow cells have a pyramidal geometry.

* * * * *